US009623824B2

(12) United States Patent
Schneider

(10) Patent No.: US 9,623,824 B2
(45) Date of Patent: Apr. 18, 2017

(54) GAS-GUIDING DEVICE, IN PARTICULAR AIR-GUIDING DEVICE, INTEGRATED IN A MOTOR VEHICLE BEAM

(71) Applicant: Röchling Automotive SE & Co. KG, Mannheim (DE)

(72) Inventor: Jürgen Schneider, Worms (DE)

(73) Assignee: Röchling Automotive SE & CO. KG, Mannheim (DE)

( * ) Notice: Subject to any disclaimer, the term of this patent is extended or adjusted under 35 U.S.C. 154(b) by 0 days.

(21) Appl. No.: 14/540,642

(22) Filed: Nov. 13, 2014

(65) Prior Publication Data

US 2015/0129336 A1    May 14, 2015

(30) Foreign Application Priority Data

Nov. 13, 2013   (DE) .......................... 10 2013 223 105

(51) Int. Cl.
| | |
|---|---|
| *B60K 11/00* | (2006.01) |
| *B60R 19/48* | (2006.01) |
| *B60K 11/08* | (2006.01) |
| *B62D 25/08* | (2006.01) |
| *B62D 21/17* | (2006.01) |

(52) U.S. Cl.
CPC ............ *B60R 19/48* (2013.01); *B60K 11/085* (2013.01); *B62D 25/082* (2013.01); *B60R 2019/486* (2013.01); *B62D 21/17* (2013.01)

(58) Field of Classification Search
CPC .......... B60R 19/48; B60R 21/34; B60K 11/00
USPC .............................. 180/68.1, 68.2, 68.3, 229
See application file for complete search history.

(56) References Cited

U.S. PATENT DOCUMENTS

| | | | | |
|---|---|---|---|---|
| 4,653,788 | A | * | 3/1987 | Di Giusto .............. B60K 11/08 188/264 A |
| 4,756,279 | A | * | 7/1988 | Temmesfeld ............ F01P 11/10 123/198 E |
| 4,902,059 | A | * | 2/1990 | Tritton .................... B60R 19/48 123/41.48 |
| 5,014,911 | A | * | 5/1991 | Vincent .............. B60H 1/00071 165/42 |
| 5,141,068 | A | * | 8/1992 | Mendicino ............. B60K 13/06 180/68.3 |
| 5,460,420 | A | * | 10/1995 | Perkins .................. B60K 11/02 293/106 |
| 5,505,639 | A | * | 4/1996 | Burg .................... B63H 11/103 440/42 |

(Continued)

FOREIGN PATENT DOCUMENTS

| | | |
|---|---|---|
| DE | 100 00 032 A1 | 7/2001 |
| DE | 102 51 945 B3 | 3/2004 |

(Continued)

OTHER PUBLICATIONS

German Search Report issued for German Patent Application No. 10 2013 223 105.9 dated Jul. 1, 2014, with machine English translation, 13 pages.

*Primary Examiner* — Hau Phan
(74) *Attorney, Agent, or Firm* — Rothwell, Figg, Ernst & Manbeck, P.C.

(57) ABSTRACT

The present invention relates to a motor vehicle beam, such as a longitudinal beam and/or a crossbeam, in particular a bumper beam, wherein the motor vehicle beam is formed as a hollow component having a closed cross section for the passage of gas, in particular air.

17 Claims, 4 Drawing Sheets

(56) References Cited

U.S. PATENT DOCUMENTS

Figure 1:
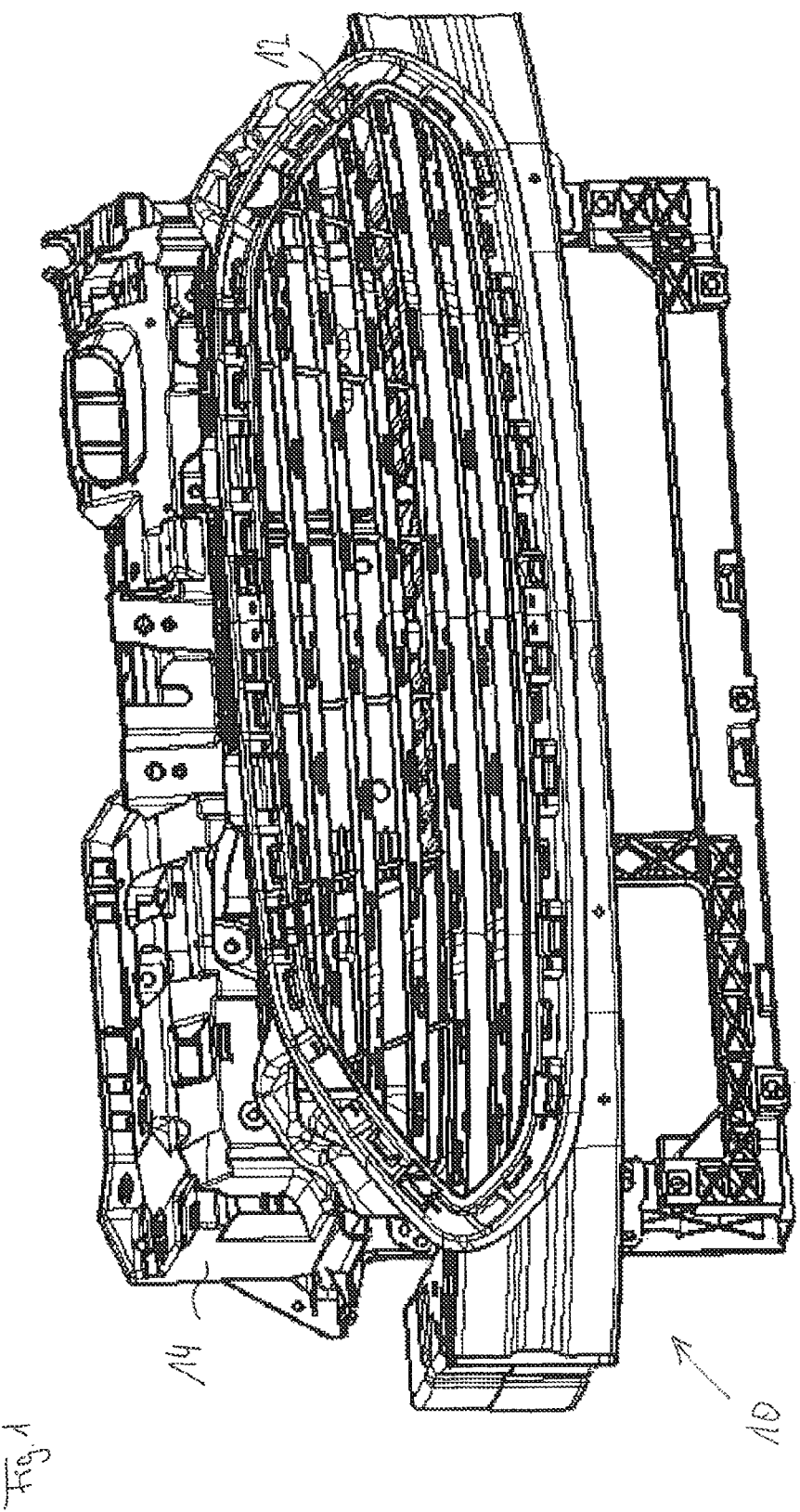

| | | | | |
|---|---|---|---|---|
| 5,860,685 | A * | 1/1999 | Horney | B60K 13/02 180/68.1 |
| 6,308,799 | B1 * | 10/2001 | Konstantakopoulos | B60R 19/48 181/272 |
| 6,598,914 | B1 * | 7/2003 | Dixon | B60K 11/04 293/106 |
| 6,786,291 | B1 * | 9/2004 | Linden | B62D 21/02 180/68.2 |
| 6,945,576 | B1 * | 9/2005 | Arentzen | B60K 13/02 180/68.3 |
| 6,951,492 | B2 * | 10/2005 | Gibbs | B60F 3/0053 440/12.5 |
| 7,713,103 | B2 * | 5/2010 | Burgoyne | B60F 3/0053 440/88 C |
| 8,109,560 | B2 * | 2/2012 | Joly-Pottuz | B60R 19/48 293/107 |
| 8,474,558 | B2 * | 7/2013 | Ohira | F02M 35/10013 180/68.3 |
| 8,746,386 | B2 * | 6/2014 | Atkinson | B60R 19/48 123/41.7 |
| 2006/0238001 | A1 | 10/2006 | Konermann et al. | |
| 2015/0084355 | A1 * | 3/2015 | Terada | B60R 19/18 293/102 |

FOREIGN PATENT DOCUMENTS

| | | |
|---|---|---|
| DE | 10 2005 006 250 B3 | 8/2006 |
| DE | 10 2005 061 506 A1 | 7/2007 |

* cited by examiner

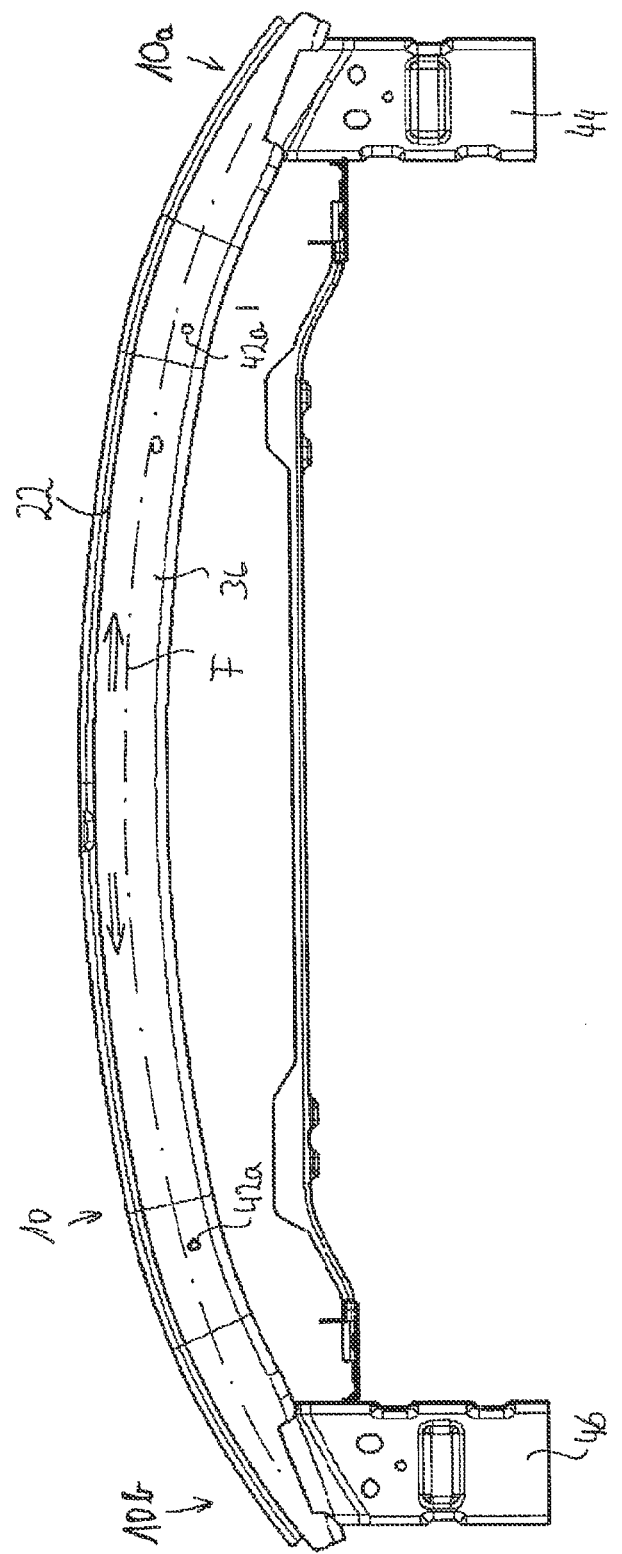

GAS-GUIDING DEVICE, IN PARTICULAR AIR-GUIDING DEVICE, INTEGRATED IN A MOTOR VEHICLE BEAM

CROSS REFERENCE TO RELATED APPLICATION(S)

This application claims priority to German Application No. 10 2013 223 105.9, filed Nov. 13, 2013. The entirety of the disclosure of the above-referenced application is incorporated herein by reference.

BACKGROUND OF THE INVENTION

Field of the Invention

The present invention relates to motor vehicle beams, such as longitudinal beams and/or crossbeams. The present invention relates in particular to crossbeams formed as bumper beams, a term which is frequently used in the relevant field of expertise.

Description of the Related Art

In the case of motor vehicles, there is often the technical problem of supplying cooling air to units arranged within functional regions surrounded by portions of bodywork. This applies for example to the engine compartment, which inter alia is surrounded by the engine cover and the wing and into which cooling air can generally be fed through a radiator grille, which is at the front in the direction of travel, in order to cool units such a coolant heat exchanger and the like.

Technical solutions are known here for providing a vehicle component with a through-flow opening which can be opened or indeed closed to different degrees by adjustable flaps for the passage of air. Air flap systems of this type can achieve, on one hand, low-emission, rapid heating of the internal combustion engine and, on the other hand, adequate convective cooling of units.

Recently, engineers and designers have been increasingly attempting to utilise the available installation space in a motor vehicle as efficiently as possible, and this has led to units and connection means in the motor vehicle, in particular in the engine compartment, being considerably condensed. This could lead to a situation in which although air flaps of an air flap system uncover a through-flow opening through which cooling air flows, this cooling air only reaches the units to be cooled to a limited extent, since additional components or assemblies of the motor vehicle may be arranged in the flow path from the air flap system to the unit to be cooled, which components or assemblies divert or block off the air flow passing through the through-flow opening in part or the units to be cooled in full.

A possible solution thereto could be an air-guiding device arranged downstream of the air flaps in the flow direction, which device guides cooling air passing through the through-flow opening in a targeted manner to the points at which convective cooling is required. However, this leads to another assembly needing to be arranged in a functional space in the motor vehicle.

The problem addressed by the present invention is therefore that of providing technical teaching that makes it possible to guide cooling air in a targeted manner to the points at which it is required for convectively cooling functional parts and functional assemblies, without increasing the number of components required therefor.

SUMMARY OF THE INVENTION

This problem is solved according to the invention by a motor vehicle beam of the type mentioned at the outset, which is formed as a hollow component having a closed cross section adapted for conducting gas, in particular air.

By means of the solution according to the invention, a component which is already provided on the motor vehicle is configured for guiding gas, generally air. Air-guiding ducts therefore do not need to be separately manufactured and mounted in the vehicle, to the extent to which gas, generally air, can be guided through crossbeams and/or longitudinal beams of the motor vehicle to the points which require convective cooling. Even if the point which requires convective cooling is remote from the point at which the gas guided within the beam exits said beam, the complexity of the air-guiding apparatus required outside the motor vehicle beam that guides the gas is considerably reduced.

The closed cross section allowing gas to be guided is crucial for the motor vehicle beam to conduct gas in its longitudinal direction, the cavity within said cross section forming a duct-like air-guiding space in the motor vehicle beam. To produce a hollow motor vehicle beam of this type more easily, it is advantageous for said beam to comprise a plurality of shell components which, when interconnected, surround a gas-guiding duct.

To make it easier to shape at least one shell component, it is preferable for a shell component to be formed as a plastics shell component and to include plastics material as a material, and preferably to be formed therefrom. A plastics shell component formed in this manner may be a deep-drawn component, or may preferably be produced as an injection-moulded component having a large design scope for the three-dimensional shape of the shell component.

Generally, the motor vehicle beam serves to lend stability to the vehicle in which it is installed, in particular also in the event of collisions. In order to prevent the function of the plastics shell component being impaired in the event of minor collisions, according to a development of the present invention it is preferable for the plastics shell component to be arranged on the side of the motor vehicle beam that faces the vehicle interior when fully mounted, and for it to preferably form the side of the motor vehicle beam that faces the vehicle interior. In this respect, the side of the motor vehicle beam that faces outwards, that is to say away from the vehicle, is preferably formed by a shell component other than the plastics shell component when fully mounted. This component can be formed so as to have higher strength and stability or rigidity than the plastics shell component, so that the plastics shell component itself remains intact if the motor vehicle beam according to the invention suffers a minor impact. Since collisions generally affect the vehicle from the outside, the inwardly facing arrangement of the plastics shell component is preferred. However, it should not be ruled out that the shell component arranged on the side of the motor vehicle beam that points towards the vehicle interior when fully mounted is made of metal, in particular steel, in part or in full.

In pursuit of the aim already set out above of forming the shell component so as to have increased strength and stability or rigidity, an additional shell component, which differs from the above-mentioned plastics shell component, may be made of metal and/or of fibre-reinforced and/or mat-reinforced and/or particle-reinforced plastics material. This shell component having increased stability and rigidity can at least comprise materials of this type. The first-mentioned embodiment is therefore referred to as the "metal shell component", whereas the second-mentioned embodiment is referred to as the "reinforced plastics shell component". Steel, the material that has proven successful in motor vehicle construction, in particular deep-drawable sheet steel, is preferred as the metal.

Although it may be considered that the shell component having increased stability and rigidity may be made of different metals, for example in portions, or of metal and reinforced plastics material, it is however preferred that the shell component having increased stability and rigidity can be produced in as few operations as possible, preferably in one operation, and therefore is substantially only made of one material.

In order to protect the plastics component connected to the shell component having increased stability and rigidity, for example in the event of minor collisions, for the above-mentioned reasons it is preferable for the shell component having increased stability and rigidity to be arranged on the side of the motor vehicle beam that faces outwards when fully mounted, and for said shell component to preferably form the side of the motor vehicle beam that faces outwards, away from the vehicle interior. The side that points towards the vehicle interior is a side of the motor vehicle beam that faces inwards when the vehicle is fully assembled. On the basis of the design of the motor vehicle beam, in particular on the basis of the curvature of a crossbeam, a person skilled in the art can also determine, without observing the motor vehicle beam on the fully assembled vehicle, which side of the motor vehicle beam faces outwards, away from the vehicle interior, and which side faces inwards, towards the vehicle interior when fully mounted.

To produce the motor vehicle beam according to the invention in the simplest and thus most cost-effective manner possible, it may be provided that it is formed from two shell components, that is to say from precisely two shell components. Preferably, said shell components are the above-mentioned plastics shell component and the shell component having increased stability and rigidity. Said shell components may be interconnected in an interlocking manner and/or with a force fit and/or in an integrally bonded manner. In this case, gluing together the two shell components falls explicitly within the meaning of an integrally bonded connection. Therefore, shell components made of different materials can also be integrally bonded to one another. In order to interconnect the shell components in a particularly robust and rigid manner, said shell components are both interconnected in an interlocking and an integrally bonded manner.

In order not only to make it possible to guide gas through the motor vehicle beam but also for it to be possible to control the amount of gas that is guided, at least one flow flap which can be moved relative to the motor vehicle beam is provided thereon and/or therein.

For example, the motor vehicle beam may comprise at least one gas inlet, through which gas can enter the cavity surrounded by the closed cross section of the motor vehicle beam from outside the motor vehicle beam. Likewise, the motor vehicle beam may comprise a gas outlet, from which gas guided within the motor vehicle beam can exit said beam again. Preferably, the gas inlet and gas outlet are remote from each other in the longitudinal direction of the motor vehicle beam.

In principle, it may be considered that one longitudinal end of the motor vehicle beam serves as the gas inlet and the opposite longitudinal end serves as the gas outlet. However, when the preferred crossbeam is the gas-guiding motor vehicle beam, it can only be designed in such a way with difficulty. In order in particular to form a crossbeam for conducting gas, it may be provided that the at least one gas inlet is formed as an opening which penetrates a side wall of the motor vehicle beam, preferably in the region of the longitudinal centre thereof, more preferably on the outwardly pointing side thereof. In the case of a front motor vehicle beam, the outwardly pointing side thereof is the front side thereof that points in the forward direction of travel when the motor vehicle bearing said beam is in operation.

The above-mentioned alternatives of a flow flap provided on the motor vehicle beam can be implemented in that the at least one gas inlet and/or the at least one gas outlet is provided with the adjustable flow flap, which can be adjusted between a closed position in which a gas flow cross section through the gas inlet and/or the gas outlet is minimal, preferably zero, and an open position in which the gas flow cross section through the gas inlet and/or the gas outlet is larger than in the closed position so that a gas flow through the gas inlet and/or the gas outlet is surely possible, and preferably the gas flow cross section through the gas inlet and/or the gas outlet is at the maximum. Preferably, the flow flap is provided on the gas inlet and prevents gas from entering the gas-guiding motor vehicle beam. Alternatively or additionally, said flap may be provided on the gas outlet and prevent gas from exiting the gas-guiding motor vehicle beam.

In order to simplify the assembly of the flow flap, said flap may be part of a flap module, comprising a frame defining a gas-flow opening and the flow flap arranged on the frame so as to be adjustable relative thereto. The flap module can then be preassembled as an assembly.

Furthermore, an actuator for adjustably actuating the flow flap is preferably provided in order to adjust the flow flap between the closed position and the open position, optionally with intermediate positions and preferably in a continuous manner. This actuator, for example an electromotor, an electromagnet or a pneumatic or hydraulic drive, may also be part of the flap module.

Above all, it is advantageous to configure a flap module as an assembly, in particular as a preassembled assembly, when the flow flap is intended to be provided on the shell component having increased stability and rigidity, for example on a gas inlet opening thereof. The flap module may be made of plastics material and have a high degree of design freedom, in particular at least the majority of the components thereof may be formed as plastics injection-moulded parts. The flap module may thus be made of a material that differs from the material of the shell component that bears said module. Again, it is the case that the flap module can be fixed to the shell component bearing said module in an interlocking manner and/or with a force fit and/or in an integrally bonded manner. In this case, it may also be sufficient to provide an opening in the shell component having increased stability and rigidity as a gas inlet opening, and to mount the flap module therein.

Alternatively or additionally, the at least one flow flap may also be provided in the motor vehicle beam. In this case, above all, the plastics shell component that can be designed with a high degree of design freedom is preferred as a support for a flow flap, rather than the shell component having increased stability and rigidity. Therefore, according to a development of the present invention, it may be provided that at least one flow flap surrounded by the fully mounted motor vehicle beam is arranged on the plastics shell component and can be moved between a blocking position in which a gas flow cross section through the motor vehicle beam is minimal, preferably zero, and a passage position in which the gas flow cross section through the motor vehicle beam is greater than in the blocking position, so that a gas flow through the motor vehicle beam is possible in a safe manner, and preferably the gas flow cross section through the motor vehicle beam is at the maximum.

Generally, the at least one flow flap can be pivoted between its positions about a pivot axis. If the flow flap is arranged in the motor vehicle beam, in this case it is preferable for the pivot axis to be oriented in a vertical direction orthogonal to the longitudinal direction and to the depth direction of the motor vehicle beam, since this requires the shortest adjustment path.

It may for example be advantageous for the flow flap to be arranged in the motor vehicle beam if, starting from a gas inlet arranged in the longitudinal centre, gas is only intended to be guided in one of the two portions of the motor vehicle beam which start from the gas inlet, in particular if gas is intended to be guided on different sides of the gas inlet in different portions at different times.

When a flow flap is pivotally arranged in the motor vehicle beam, a pivot shaft of the flow flap can be guided through the wall of the motor vehicle beam, in particular of the plastics shell component, so that an actuator can be connected to the part of the shaft positioned outside the motor vehicle beam, for example via a crank arm.

When the flow flap is arranged on the motor vehicle beam, the pivot axis can be oriented as desired. In particular at the gas inlet, it is preferable for the pivot axis to be oriented parallel to the longitudinal direction of the motor vehicle beam in order to achieve a flow of gas into the motor vehicle beam that is as uniform as possible in the longitudinal direction of the motor vehicle beam (in the case of a crossbeam, this is the transverse direction of a vehicle bearing said beam). Preferably, the gas inlet opening is positioned at the longitudinal centre of the crossbeam in order to ensure that inflowing gas is distributed as evenly as possible towards both longitudinal ends.

In order to form the motor vehicle beam according to the invention to have the highest possible rigidity, it is preferable, when installed in a vehicle, for said beam to extend in its longitudinal direction mainly in the transverse direction of the vehicle, in its vertical direction mainly in the vertical direction of the vehicle and in its depth direction mainly in the longitudinal direction of the vehicle, the motor vehicle beam having a tapered region in the region of its vertical centre, which tapered region has smaller dimensions in the depth direction than regions positioned thereabove or therebelow in the vertical direction and preferably extends over substantially the entire length of the motor vehicle beam.

BRIEF DESCRIPTION OF THE DRAWING FIGURES

Figure 2:
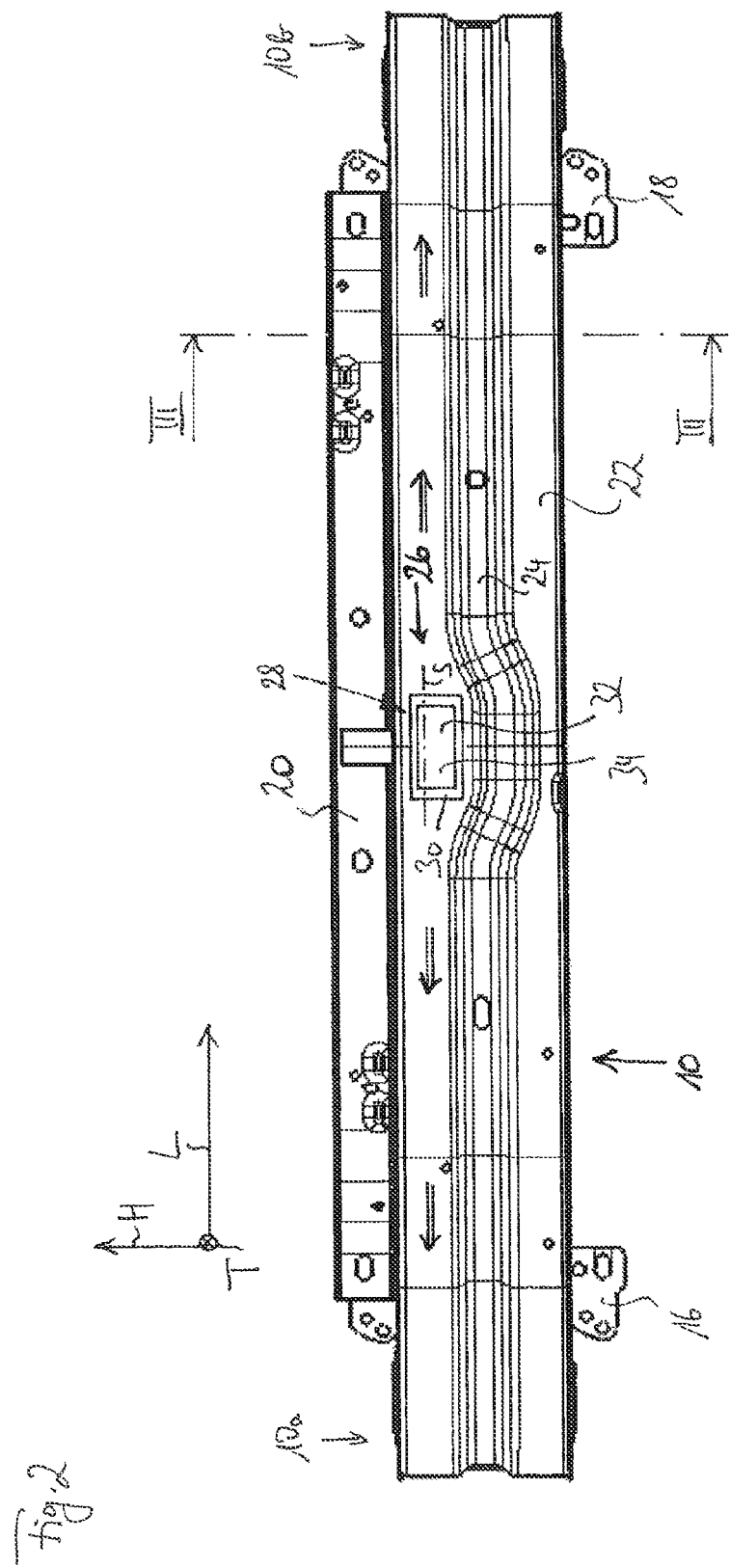
Figure 3:
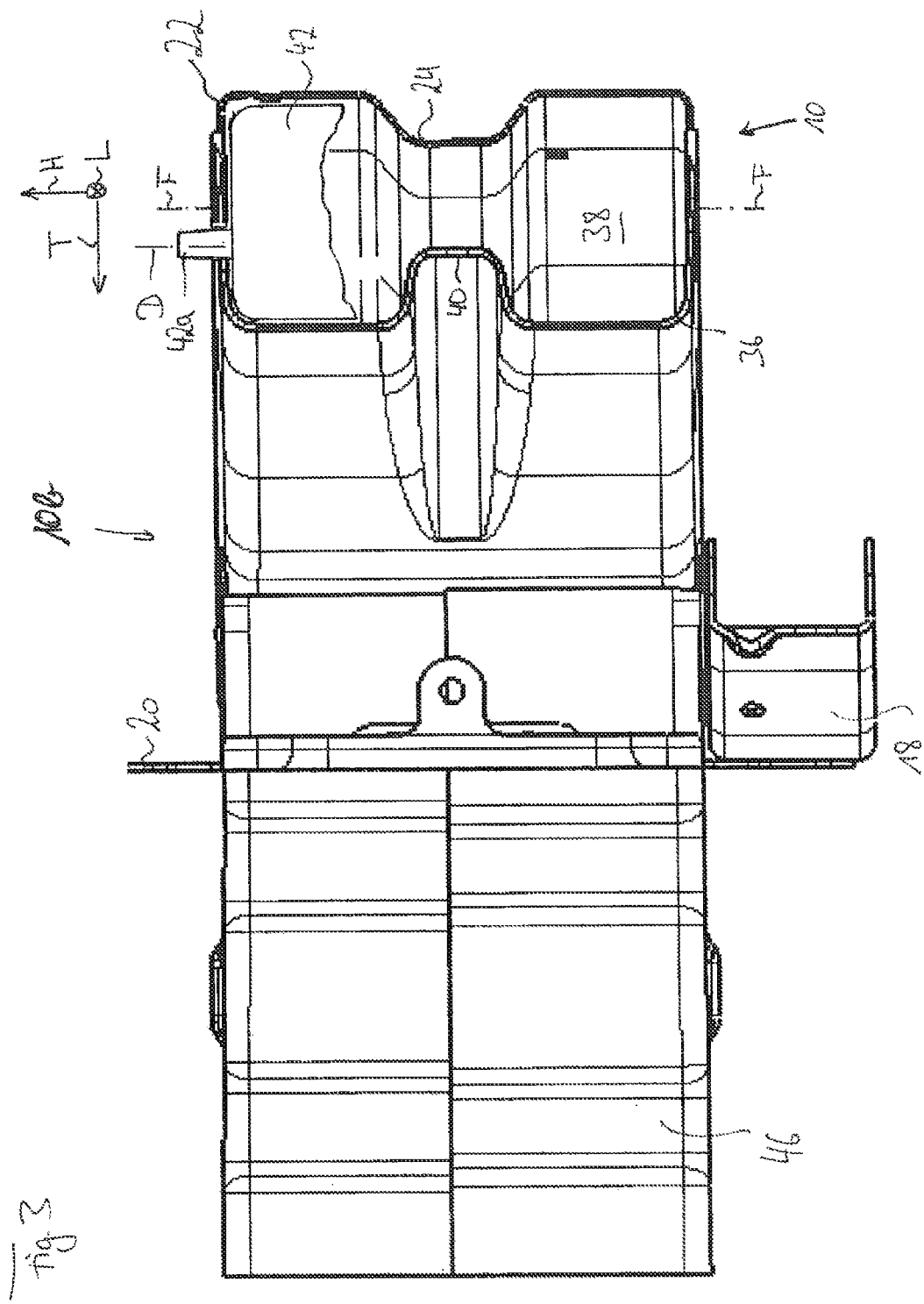

The present invention is explained in greater detail in the following with reference to the accompanying drawings, in which:

FIG. 1 is a perspective view of a motor vehicle beam according to the invention in the form of a crossbeam, in front of which a radiator grille is arranged and behind which further vehicle units are arranged, FIG. 2 is a front view of the crossbeam from FIG. 1, FIG. 3 is a sectional view through the crossbeam along line III-III in FIG. 2, and FIG. 4 is a plan view of the crossbeam from FIGS. 1 to 3.

DETAILED DESCRIPTION OF THE PREFERRED EMBODIMENTS

FIG. 1 is a perspective view of a crossbeam 10 as an embodiment according to the invention of a motor vehicle beam of the present application. In order to show how it is arranged on a vehicle, an irregularly oval-shaped radiator grille 12 that is positioned in front of the crossbeam 10 when fully mounted is shown and components 14 positioned behind the crossbeam 10 are shown.

The longitudinal end of the crossbeam 10 which is on the right in FIG. 1 is not shown. The crossbeam 10 is shown with a sketched, zigzag edge on the right-hand longitudinal end thereof.

FIG. 2 is a front view of the crossbeam 10 from FIG. 1, that is to say a view in which an observer is standing in front of the vehicle bearing the crossbeam 10.

Fastening elements 16, 18 and 20 serve to mount additional structural elements on the crossbeam 10.

In FIG. 2, said observer is looking from the front at a shell component 22 having increased stability and rigidity, which is preferably produced from metal, in particular steel, in a deep-drawing process.

The metal shell component 22 having increased stability and rigidity is provided so as to point outwards, that is to say so as to point away from the vehicle interior, when the crossbeam 10 is fully mounted on the vehicle.

In order to increase the rigidity of the shell component 22, it is provided with a bead 24 extending in the longitudinal direction L of the crossbeam 10.

The bead 24 is preferably offset to one side in the vertical direction H of the crossbeam in a portion containing the longitudinal central region of the crossbeam 10, and in the present case is offset downwards, for example to create space for a gas inlet opening 26. The bead 24 may, however, also extend differently to the way in which it is shown.

An assembly 28 made up of a frame 30 and a flow flap 32 that is received pivotally about a pivot axis S on the frame 30 is preferably inserted into the gas inlet opening 26. Said pivot axis S advantageously extends approximately parallel to the longitudinal direction L of the crossbeam 10. The assembly 28 is advantageously bonded via the frame 30 to the shell component 22 in the region surrounding the gas inlet opening 26 and engages behind the edge of the shell component 22 surrounding the gas inlet opening 26, for example by means of resilient latching lugs. The frame 28 and, together therewith, the flow flap 30 are thus provided on the shell component 22 in an interlocking and integrally bonded manner.

By means of an actuator (not shown in FIG. 2), the flow flap 32 can be adjusted between the closed position shown in FIG. 2 in which a gas flow opening 34 that is surrounded by the frame 30 is completely closed and an open position in which the surface area of the gas flow opening 34 through which gas can flow is at the maximum.

The actuator may be an electromotor, an electromagnet or a pneumatically or hydraulically operable piston-cylinder assembly. The flow flap can be biased into an end position by pre-adjusting springs.

When the flow flap 32 is not in its closed position shown in FIG. 2, air passes through the gas flow opening 34 owing to the movement of the vehicle relative to the surrounding atmosphere when the vehicle bearing the crossbeam 10 is travelling in a straight line, and is distributed approximately equally towards the right-hand longitudinal end 10*a* and the left-hand longitudinal end 10*b* of the crossbeam 10 owing to the preferred arrangement of the gas inlet opening 26 in the longitudinal centre. The gas flow is indicated by double-line arrows.

FIG. 3 is a cross section through the crossbeam 10 along line III-III from FIG. 2. It can be seen that a plastics shell component 36 made of plastics material is provided on the side of the crossbeam 10 that points towards the vehicle interior when fully mounted, which plastics shell component defines a cavity 38 together with the metal shell component 22, which cavity forms an air-guiding duct within the crossbeam 10. For the purposes of increased inherent stability, the plastics shell component 36 is also preferably configured to have a bead 40 extending in the longitudinal direction L of the crossbeam 10.

The shell components 22 and 36 are interconnected in a bonded manner, and they are also preferably interconnected in an interlocking manner, for example by clipping or locking into place. For this purpose, corresponding latching lugs can be formed in the preferably injection-moulded plastics shell component 36.

The parting plane or joint plane between the shell components 22 and 36 is preferably in the centre in the depth direction, at the point denoted F.

The way in which the joining point extends can be seen well in FIG. 4 in the plan view of the crossmember 10.

In addition to or as an alternative to the flow flap 32, a further flow flap 42 may also be provided within the crossbeam 10, for example as an asymmetrical butterfly flap 42, as can be seen in FIG. 3 in the upper part of the cavity 38.

The flow flap 42 that is substantially symmetrical to the vertical centre in the vertical direction H may be rotatable about a rotational axis D which is defined by shaft ends 42a which penetrate the plastics material of the plastics shell component 36. The shaft ends 42 are preferably integrally formed with the flow flap 42. An actuator for rotatably adjusting the flow flap 42 may be coupled to the portion of the shaft end 42a located outside the crossbeam 10.

At the longitudinal ends 10a and 10b thereof, the crossbeam 10 may be coupled to longitudinal beam portions 44 and 46, which also form cavities, so that air flowing within the crossbeam 10 at the longitudinal ends 10a and 10b thereof can overflow into the longitudinal beam portions 44 and 46.

The beads 24 and 40 in the shell components 22 and 36 cause the cavity 38 in the crossbeam 10 to be constricted in the depth direction T.

In the gas outlet openings on the side of the crossbeam 10 that points towards the vehicle interior, gas can exit the cavity 38 in the crossbeam 10 and enter the longitudinal beam portions 44 and 46. Said portions can in turn comprise gas outlet openings, from which the gas, generally air, flowing into the gas inlet opening 26 can exit at a point requiring convective cooling.

Using the present invention, for example cooling air can thus be guided from a longitudinally central region of the crossbeam 10 which, when fully mounted, approximately coincides with a region in the transverse centre of the vehicle to the longitudinal end regions 10a and 10b of the crossbeam and onwards from here to points that require cooling, without specific air-guiding means being required therefor. Instead, the air-guiding function is integrated in beams 10 and optionally 44 and 46 of a motor vehicle that are already provided.

I claim:

1. A motor vehicle bumper beam formed as a hollow component having a closed cross section adapted for the passage of gas, the motor vehicle bumper beam comprising:
a plurality of shell components which, when interconnected, define a cavity forming a gas-guiding duct extending in a direction aligned with longitudinal ends of the motor vehicle bumper,
wherein one of said shell components is formed as a plastics shell component comprising plastics material as a material, and
wherein one of said shell components has a higher stability and rigidity than the other shell components from the plurality of shell components, and is formed as at least one of a metal shell component comprising metal as a material and reinforced plastics material shell component comprising at least one of fibre-reinforced, mat-reinforced and particle-reinforced plastics material as a material.

2. The motor vehicle bumper beam according to claim 1, wherein the plastics shell component is arranged on the side of the motor vehicle bumper beam that faces the vehicle interior when mounted.

3. The motor vehicle bumper beam according to claim 1, wherein the shell component having increased stability and rigidity is arranged on the side of the motor vehicle bumper beam that faces outwards when fully mounted.

4. The motor vehicle bumper beam according to claim 1, wherein said motor vehicle bumper beam is made up of two shell components including the plastics shell component and the shell component having increased stability and rigidity, which are interconnected in an interlocking manner and/or with a force fit and/or in an integrally bonded manner.

5. The motor vehicle bumper beam according to claim 4 wherein at least one flow flap surrounded by the fully mounted motor vehicle bumper beam is arranged on the plastics shell component and can be moved between a blocking position in which a gas flow cross section through the motor vehicle bumper beam is minimal, and a passage position in which the gas flow cross section through the motor vehicle bumper beam is greater than in the blocking position, so that a gas flow through the motor vehicle bumper beam is possible in a safe manner, and in which the gas flow cross section through the motor vehicle bumper beam is at the maximum.

6. The motor vehicle bumper beam according to claim 1, wherein at least one flow flap which can be moved relative to the motor vehicle bumper beam is provided thereon and/or therein.

7. The motor vehicle bumper beam according to claim 1, wherein said motor vehicle bumper beam comprises at least one gas inlet and at least one gas outlet.

8. The motor vehicle bumper beam according to claim 7, wherein the at least one gas inlet is formed as an opening which penetrates a side wall of the motor vehicle bumper beam, in the region of the longitudinal centre thereof.

9. The motor vehicle bumper beam according to claim 7, wherein at least one flow flap which can be moved relative to the motor vehicle bumper beam is provided thereon and/or therein, and
wherein the at least one gas inlet and/or the at least one gas outlet is provided with the adjustable flow flap, which can be adjusted between a closed position in which a gas flow cross section through the gas inlet and/or the gas outlet is minimal, and an open position in which the gas flow cross section through the gas inlet and/or the gas outlet is larger than in the closed position so that a gas flow through the gas inlet and/or the gas outlet is possible, and in which the gas flow cross section through the gas inlet and/or the gas outlet is at the maximum.

10. The motor vehicle bumper beam according to claim 9, wherein the flow flap is part of a flap module, comprising a frame defining a gas-flow opening and the flow flap arranged on the frame so as to be adjustable relative thereto.

11. The motor vehicle bumper beam according to claim 10 wherein the flap module as an assembly is fixed to the shell component having increased stability and rigidity.

12. The motor vehicle bumper beam according to claim 1, wherein, when installed in a vehicle, said motor vehicle bumper beam extends in its longitudinal direction mainly in the transverse direction of the vehicle, in its vertical direction mainly in the vertical direction of the vehicle and in its depth direction mainly in the longitudinal direction of the vehicle, the motor vehicle bumper beam having a tapered region in the region of its vertical centre, which tapered region has smaller dimensions in the depth direction than regions positioned thereabove or therebelow in the vertical direction.

13. The motor vehicle bumper beam according to claim 12, wherein the tapered region extends over substantially the entire length of the motor vehicle bumper.

14. The motor vehicle bumper beam according to claim 1, wherein the plastics shell component is arranged on the side of the motor vehicle bumper beam that faces the vehicle interior when mounted and forms the side of the motor vehicle bumper beam that faces the vehicle interior.

15. The motor vehicle bumper beam according to claim 1, wherein the shell component having increased stability and rigidity is a steel shell component, and comprises steel as a material.

16. The motor vehicle bumper beam according to claim 1, wherein the shell component having increased stability and rigidity is made of at least one of fibre-reinforced, mat-reinforced, and particle-reinforced plastics material as a material.

17. The motor vehicle bumper beam according to claim 1, wherein the shell component having increased stability and rigidity is made of metal as a material.

* * * * *

UNITED STATES PATENT AND TRADEMARK OFFICE
CERTIFICATE OF CORRECTION

PATENT NO. : 9,623,824 B2
APPLICATION NO. : 14/540642
DATED : April 18, 2017
INVENTOR(S) : Jürgen Schneider Page 1 of 1

It is certified that error appears in the above-identified patent and that said Letters Patent is hereby corrected as shown below:

On the Title Page

In Item (73), under Assignee: "Röchling Automative SE & Co. KG, Mannheim (DE)" should read as -- Röchling Automotive SE & Co. KG, Mannheim (DE) --.

Signed and Sealed this
Twenty-sixth Day of June, 2018

Andrei Iancu
*Director of the United States Patent and Trademark Office*